United States Patent [19]

Willinger et al.

[11] Patent Number: 4,861,468
[45] Date of Patent: Aug. 29, 1989

[54] ROTOR IMPELLER ASSEMBLY

[75] Inventors: Allan H. Willinger, Oakland, N.J.; Jonas Ivasauskas, West Nyack, N.Y.

[73] Assignee: Willinger Brothers, Inc., Oakland, N.J.

[21] Appl. No.: 150,932

[22] Filed: Feb. 1, 1988

[51] Int. Cl.⁴ .............................................. A01K 63/04
[52] U.S. Cl. .................. 210/169; 210/416.2; 119/5
[58] Field of Search ............... 210/169, 416.2; 417/42 D; 119/5; 310/43

[56] References Cited

U.S. PATENT DOCUMENTS

| | | | |
|---|---|---|---|
| 3,872,334 | 3/1975 | Loubier | 310/43 |
| 4,407,641 | 10/1983 | Long | 417/420 |
| 4,512,885 | 4/1985 | Willinger | 210/169 |
| 4,549,157 | 10/1985 | Loubier | 310/156 |
| 4,589,982 | 5/1986 | Willinger | 210/169 |
| 4,602,996 | 7/1986 | Willinger | 210/169 |
| 4,678,568 | 7/1987 | Goldman et al. | 210/169 |
| 4,678,616 | 7/1987 | Kawashima | 310/164 |
| 4,735,715 | 4/1988 | Willinger | 210/169 |
| 4,761,227 | 8/1988 | Willinger et al. | 210/169 |

FOREIGN PATENT DOCUMENTS 3136383 9/1981 Fed. Rep. of Germany .
3516061 5/1985 Fed. Rep. of Germany .

Primary Examiner—Peter Hruskoci
Assistant Examiner—Christopher Upton
Attorney, Agent, or Firm—Helfgoot & Karas

[57] ABSTRACT

A rotor impeller assembly for use with an electomagnetic stator unit including a shaft with a magnetic rotor directly mounted on the shaft. An impeller unit is rotationally mounted with respect to the shaft. A clutch between the magnetic rotor and the impeller unit rotationally drives the impeller unit by means of the magnetic rotor. The magnetic rotor is formed as an injection molded magnet. The impeller unit is used within an aquarium filter for drawing water from the aquarium tank into the aquarium filter for filtration and discharge back into the aquarium tank.

2 Claims, 4 Drawing Sheets

ROTOR IMPELLER ASSEMBLY

BACKGROUND OF THE INVENTION

This invention relates to a magnetic rotor impeller assembly, and more particularly to such rotor assembly for use with an electromagnetic unit for drawing aquarium water into an aquarium for filtration of the contaminated aquarium water.

Aquarium filters are generally utilized for filtering and aerating aquarium water to maintain a clean environment for the fish in an aquarium tank and remove contaminated particles from the water. One type of aquarium filter is known as an external aquarium filter which hangs over the edge of the aquarium tank. An intake tube from the filter extends into the aquarium water. Water is drawn through the intake tube into a receiving chamber in the filter housing. The contaminated water then passes into a filtering chamber where the water circulates through filtering material which removes contaminating particles and debris from the water. The filtered water is then discharged from the filter housing back into the aquarium tank in a filtered and aerated condition.

In order to draw the water from the aquarium tank and pass it through the filter housing, there is typically utilized an impeller unit. The impeller is in the form of a pump which creates a reduced pressure at a location within the filter housing to cause water from the aquarium tank to be drawn into the filter housing. Such impeller is generally driven by a motor coupled to the filter housing.

In U.S. Pat. No. 4,512,885 there is described an external aquarium filter which includes a rotor magnetically coupled to an electromagnetic stator unit. An impeller is mounted with respect to the rotor for driving engagement by the rotor. In such aforementioned patent, the electromagnetic stator unit is removably coupled to the filter housing and includes a well hermetically separated from the stator stack. The rotor is part of an assembly which comprises a shaft which is fixed with respect to the stator unit. The rotor is rotatingly positioned on the shaft. A magnet is insert molded onto the rotor. The impeller is likewise rotatingly mounted onto the shaft and is operatively connected to be driven by the rotor. The electromagnetic stator unit creates a flux which is cut by the magnet to cause the rotor to rotate upon the shaft and drive the impeller. The impeller creates a reduced pressure which draws the aquarium water into the filter housing for filtration and aeration.

The rotor assembly in the aforementioned patent forms a single unitary assembly including the shaft, the rotor, the magnet mounted onto the rotor, and the impeller. A washer is mounted onto the shaft and plugs placed at opposing ends of the shaft to fix it in position with one end seated into the well and the other end fixed into an appropriate seat provided in the intake tube.

In manufacturing the rotor unit, a ceramic magnet was generally utilized and insert molded onto the rotor. In creating such ceramic magnet, the magnet would be molded, ground, and then insert molded onto the rotor unit, and then magnetized. The magnet being of ceramic material might suffer from shrinkage, might develop hairline cracks, and was costly both to manufacture and assemble. Nevertheless, such ceramic magnets were viewed to be the best type and most suitable for such purpose.

SUMMARY OF THE INVENTION

It is an object of the present invention to provide a rotor assembly which utilizes an injection molded magnet for interaction with the electromagnetic stator unit for an aquarium filter.

A further object of the present invention is to provide a rotor impeller assembly for use with an electromagnetic stator unit where the magnet itself serves as the rotor for mounting directly on a shaft.

Still another object of the present invention is to provide a rotor impeller assembly for use within an aquarium filter unit, wherein the rotor is an injection molded magnet and directly interacts with the electromagnetic stator unit.

Yet a further object of the present invention is to provide an armature unit for a synchronous motor having a magnetic rotor directly mounted onto a fixed shaft.

Still another object of the present invention is to provide a synchronous motor having an armature wherein the armature is permitted to arbitrarily rotate in either rotational direction upon starting and with the magnet being an injection molded magnet.

Another object of the present invention is to provide an aquarium filter utilizing a magnetically coupled rotor impeller assembly with the magnet being an injection molded magnet.

Briefly, in accordance with the present invention, there is provided a rotor impeller assembly for use with an electromagnetic stator unit. The rotor impeller assembly includes a shaft with a magnetic rotor directly mounted onto the shaft. An impeller is also rotationally mounted with respect to the shaft. A clutch mechanism provided between the magnetic rotor and the impeller rotationally drives the impeller by means of the rotation of the magnetic rotor.

The rotor impeller assembly is actually formed as an armature unit of a synchronous motor. The synchronous motor serves to drive the rotor in either of two opposing rotational directions upon starting. The impeller is such that it can operate in either of the two directions and provides no preference to either direction of rotation. Accordingly, no additional coils are needed for determining rotational directivity. The clutch unit serves to engage and drive the impeller in either of the two directions in which the rotor started.

The rotor is an injection molded magnet and, accordingly, the rotor itself is magnetized and serves as the magnet for engaging with the electromagnetic stator unit.

The rotor impeller assembly of the present invention finds use as an impeller for drawing water through an aquarium filter. The water enters the filter through an intake assembly and is stored in a receiving chamber. The water then passes to a filtering chamber where it flows through filtering material to remove contaminating debris and particles. The water is then discharged back to the aquarium tank in a filtered and aerated condition.

The aforementioned objects, features and advantages of the invention will, in part, become obvious from the following more detailed description of the invention, taken in conjunction with the accompanying drawings, which form an integral part thereof.

BRIEF DESCRIPTION OF THE DRAWINGS

In the drawings.

In the various figures like reference characters designate like parts.

DETAILED DESCRIPTION OF THE INVENTION

Figure 1:
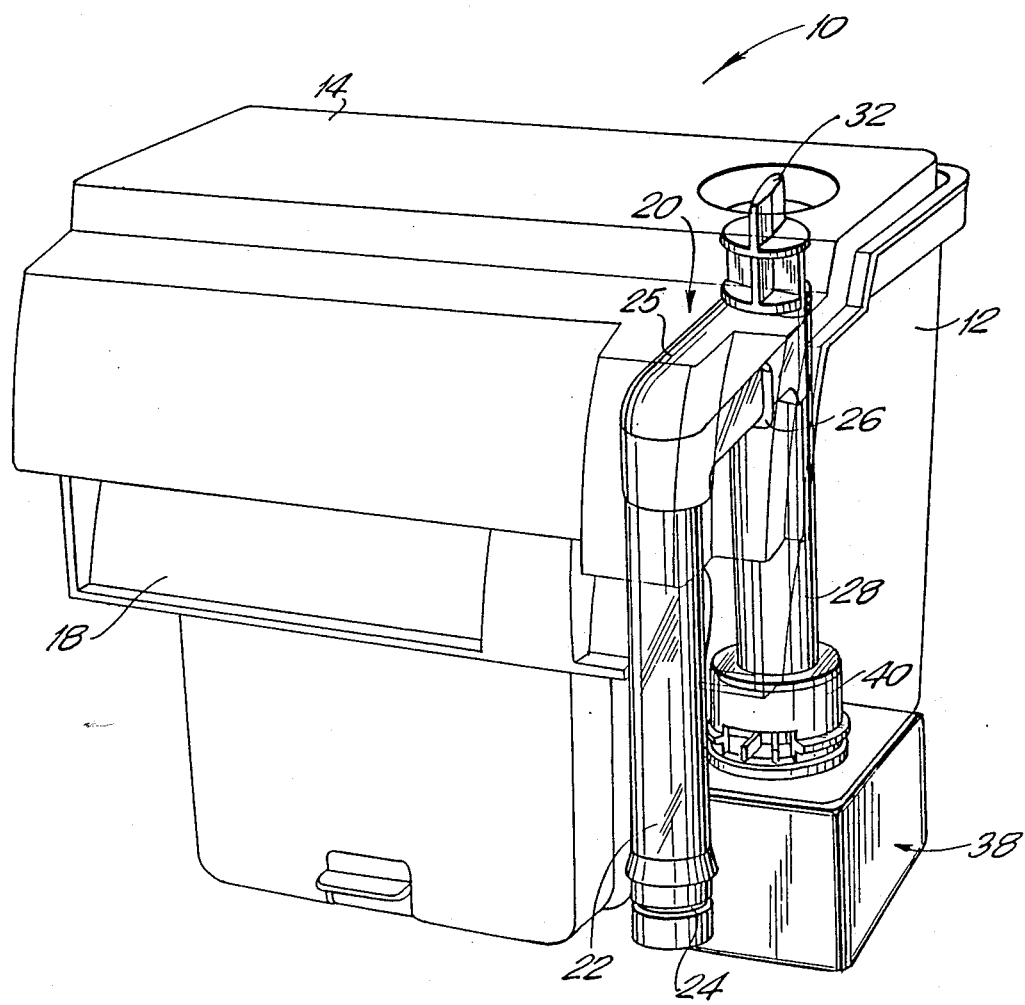
FIG. 1 is a perspective view of an aquarium filter showing a unitary intake assembly from which depends the rotor impeller unit of the present invention inserted into an electromagnetic stator unit coupled to the filter housing.
Figure 2:
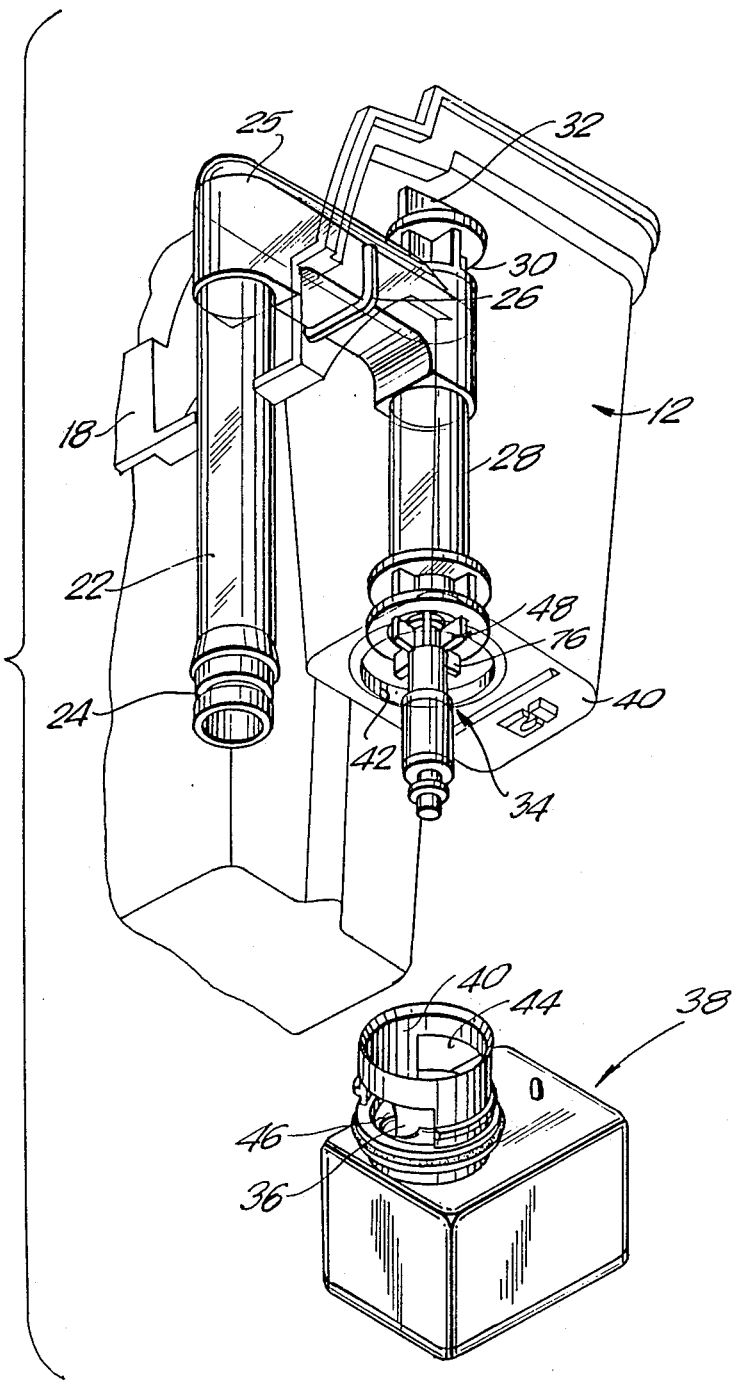
FIG. 2 is a broken away perspective view of the filter of FIG. 1 and showing the electromagnetic stator unit separated from the filter housing to expose the depending rotor impeller unit.
Figure 3:
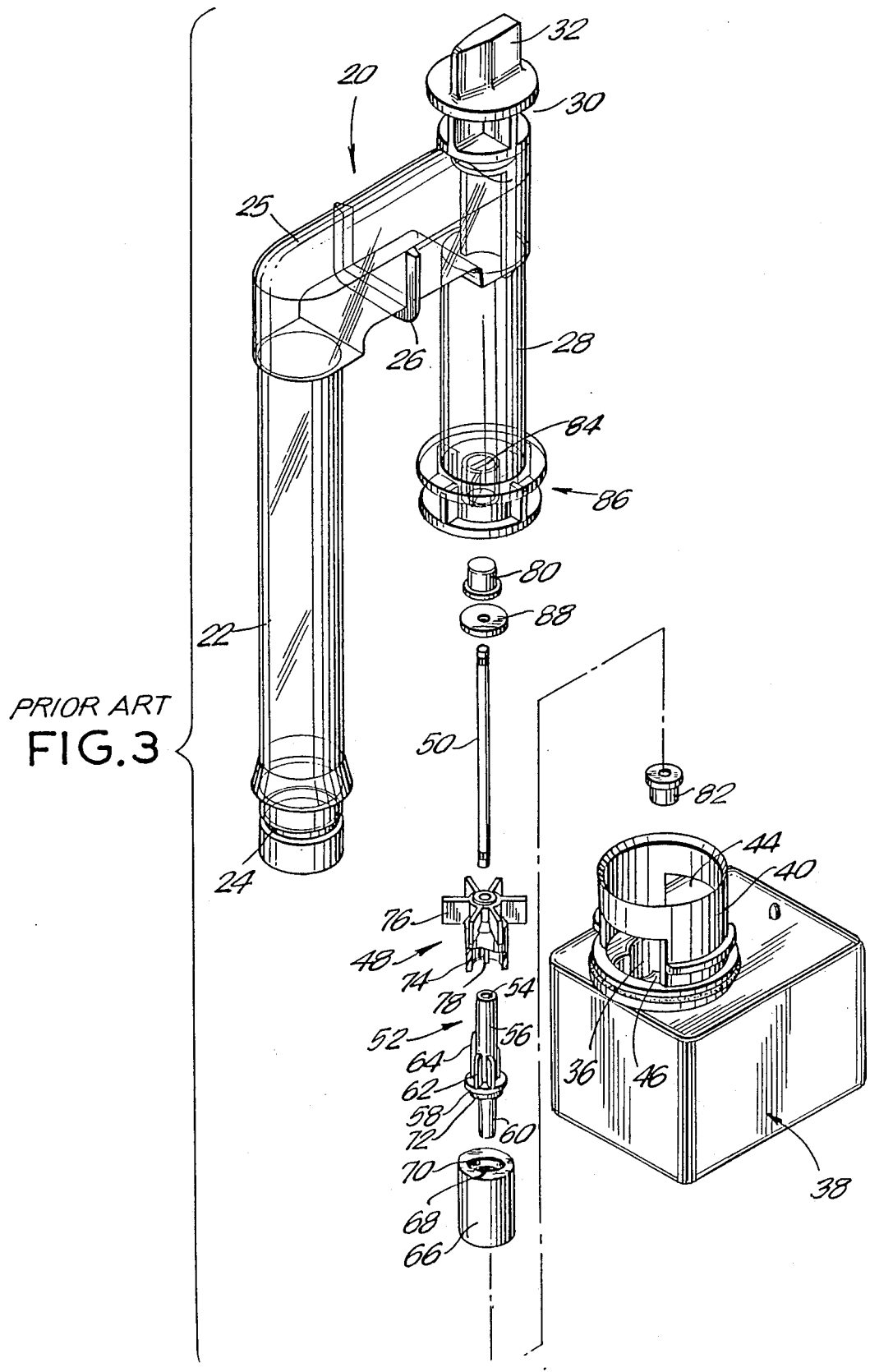
FIG. 3 is an exploded perspective view of the unitary intake assembly and the depending rotor impeller unit for insertion into the electromagnetic stator unit.

Referring to FIGS. 1-3, there is generally shown an external aquarium filter 10 which would be placed over the exterior wall of an aquarium tank. The aquarium filter includes a filter housing 12 on which is provided a removable cover 14. Within the housing there is a receiving chamber 16 in which is received the contaminated aquarium water. The water then passes into a filtering chamber in which there is provided filter material such as a filter cartridge as described in co-pending application Ser. No. 871,106, now U.S. Pat. No. 4,783,258. The filtered water is then discharged along a spillway 18 from which the water passes back to the aquarium tank. For more details of the construction of the filter reference is had to the aforementioned U.S. Pat. Nos. 4,512,885 and 4,602,996.

To bring the water into the aquarium tank there is provided a unitary intake assembly 20, as can best be noted in FIG. 3. The intake assembly includes an elongated downwardly depending intake tube 22 at the end of which there is a coupling connector 24 for facilitating connection to additional extensions in order to reach the aquarium tank water. A substantially horizontal leg 25 includes a positioning rib 26 for seating the intake assembly onto the aquarium housing unit, as best shown in FIGS. 1 and 2. A further downward depending leg 28 extends into the receiving chamber of the filter housing, as can best be seen in FIG. 2. A control valve 30, including an externally manipulable knob 32 is positioned along the interconnected legs of the unitary intake assembly to control the amount of water flow from the aquarium tank. For further details of the control valve reference is had to U.S. Pat. No. 4,602,996.

Depending from the unitary intake assembly is a rotor impeller unit, shown generally at 34. The rotor impeller unit is designed to fit into a well 36 which extends into an electromagnetic stator unit 38.

The electromagnetic stator unit 38 is removably connected at the bottom 40 of the receiving chamber of the filter housing 12. It includes an upwardly extending collar 40 which is received within an aperture 42 provided at the bottom of the filter housing 12. A pair of openings 44, 46 on either side of the collar are positioned to correspond to the location of an impeller unit 48 rotatably positioned along the rotor impeller unit. For more details of the energizer, the collar, and the interconnection between the collar and the filter housing, reference is had to co-pending U.S. application Ser. No. 910,121, now U.S. Pat. No. 4,735,715.

With reference now to FIG. 3, it is noted that the rotor impeller unit includes a fixed shaft 50 along which is positioned a rotor 52. The rotor includes an internal bore 54 formed within a tube 56 having a lower flange 58 separating the tube 56 from a depending stem 60. A plurality of locating ribs 62 are positioned along the tube 56 and one rib extends further upwardly 64 to define a clutch.

The rotor is rotably mounted onto the shaft 50. A ceramic magnet 66 was independently formed. Typically it was molded, ground, and finished off to provide an insert for molded stem 60. In order to prevent rotation of the magnet 68 on the stem, the upper end of the bore 66 provided in the magnet includes an oval shaped countersink 70 in which is molded a depending plug 72 which depends from the underside of the flange 58 of the rotor unit 52.

The impeller unit 48 includes a sleeve 74 at the upper end of which are the impeller blades 76. Internally, a corresponding rib 78 serves as a mating clutch portion to the rib 64. Upon rotation of the rotor, the rib 64 will engage the mating rib 74 and thereby cause the rotor to drive the impeller 48.

The shaft 50 is fixed by means of a plug 80 at the upper end, and a corresponding plug 82 at the lower end. The lower end plug 82 is seated into the bottom of the well 36 in the electromagnetic stator unit 38. The upper plug 80 sits within a seat 84 provided at the lower end 86 of the leg 28 of the intake assembly unit. This positions the impeller blades 76 just below the end 86 of the intake assembly unit and specifically within the windows 44, 46 in the collar 40 of the electromagnetic stator unit collar. A thrust washer 88 is placed above the impeller unit 48 to prevent wear on the impeller due to axial movement of the rotor during operation.

The type of motor that is used is a type known as a synchronous motor. With such motors, the rotor unit, or armature, can rotate in either of the two opposite rotational directions. At starting, it is unknown which direction the rotor will take. Normally, synchronous motors require the addition of a starting coil frequently referred to as a shaded coil, or eddy current drive, in order to control the direction of starting rotation. This will serve to insure that each time the motor starts it will operate in the same rotational direction.

In the present application for use with an aquarium filter, either direction of rotation will be suitable. Accordingly, it makes no difference whether the rotor begins in a clockwise or counterclockwise direction. The clutch mechanism shown as the engaging ribs 64 and 74 is such that it will permit the rotor to begin rotation of the first cycle until such time as the rib 64 engages the rib 74. At that time, it will pick up the impeller and serve to drive the impeller in the same rotational direction in which the rotor is moving. The clutch mechanism also permits the rotor to initially start without the load of the impeller. This reduces the inertia upon starting and permits easier start up. Once rotation occurs, the clutch engaging ribs will pick up the impeller and cause it to rotate in the same direction.

The heretofore described rotor unit employs a ceramic magnet. Such ceramic magnets, however, are brittle and, accordingly, have the possibility of chipping or cracking. Furthermore, the cost of such ceramic magnet is fairly high and the possibilities of shaping it are limited. There is some weight problem in using a ceramic magnet and the requirements to attend to shrinkage problems, and other problems add to the cost and difficulty of working with the ceramic magnet.

The injection molded magnet reduces the cost, provides an improvement in the power of the magnet, and not only can the magnet itself be formed through injection molding, but the entire magnet and rotor can now be integrated into a single structure and integrally formed. Additionally, despite the presence of magnetic material beyond the height of the electromagnetic stator stack, the additional magnetic material of the rotor provides no detraction from the operation and efficient magnetization of the rotor portion.

Figure 4:
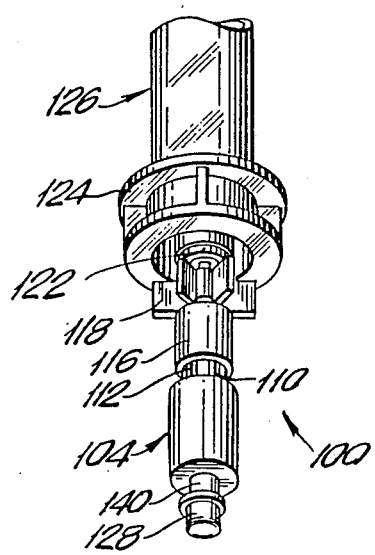
FIG. 4 is a broken away perspective unit of the assembled rotor impeller unit of the present invention depending from a unitary intake assembly.

More specifically, referring now to FIGS. 4–6, there will be described the rotor unit of the present invention utilizing an injection molded magnet where the magnet and the rotor are integrated into a single structure. The magnet rotor impeller unit is generally shown at 100 and includes a shaft 102. The integral magnetic rotor is shown at 104 and includes a barrel portion 106 from which projects an upwardly extending tubular portion 108. The locating ribs 110 are formed in the lower part of the tubular portion 108 and the clutch rib 112 extends upwardly above the locating ribs 110.

The clutch rib 112 will engage with a corresponding rib 114 projecting on the interior of the sleeve 116. At the upper end of the sleeve 116 are the impeller blades 118. The sleeve 116 will be mounted directly over the tube 108 of the magnetic rotor.

At the upper end there is provided a plug 120 which will fit into a seat 122 at the lower end 124 of the unitary intake assembly 126. A similar plug 128 is placed at the bottom of the shaft and will seat at the bottom of the well in the electromagnetic stator unit. A thrust washer 130 can be placed at the upper end of the impeller to accommodate axial movement.

Figure 5:
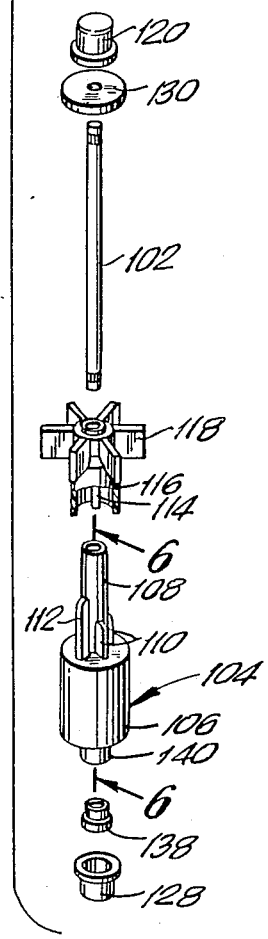
FIG. 5 is a perspective exploded view of the rotor impeller unit of the present invention in accordance with a first embodiment thereof.
Figure 6:
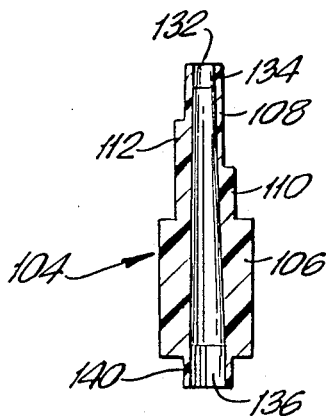
FIG. 6 is a cross sectional view taken along line 6—6 of the magnetic rotor shown in FIG. 5.

The center bore 132 formed in the unitary magnetic rotor 104 is shown in FIG. 6 to have an accurate upper end 134 and to thereon outwardly flare to provide a wider lower end 136. Accordingly, the upper end 134 will be accurate to provide an upper bearing. In the lower end, however, a separate push-in bearing 138, as shown in FIG. 5, will be inserted within the lower part 140 of the rotor. This will then provide an accurate upper and lower bearing for the magnetic rotor 104.

It should be appreciated, that the bore 132 could be made accurate at both its upper end and lower end to thereby eliminate the use of the additional push-in bearing. Alternately, push-in bearings could be used both at the upper and lower end wherein the bore would be made larger than the required size and the push-in bearings would take up the accuracy of the shaft size. By making the push-in bearing at the upper end, it would be possible to integrate the thrust washer and the push-in bearing into a single unit.

It will be appreciated by comparing the structure of FIG. 5 with that of FIG. 3, that in the present situation, it is not just the magnet that is formed of different material. At present, the magnet is now integrated with the rotor into a single unit. The entire unit, both the magnet and the rotor, are formed of magnetic material. Accordingly, it will be appreciated that the rotor which is magnetized extends beyond the electromagnetic stator unit. Thus, it might have been thought that some of the flux on the electromagnetic stator unit would have been lost in the additional magnetic material provided as part of the rotor and extending beyond the stator stack of laminations in the electromagnetic stator unit. However, it has been found that the use of the integrated magnetic rotor formed of injection molded magnet material actually provides a more powerful magnet. It therefore permits the use of less copper in the coil in the electromagnetic stator unit. This again reduces the costs involved in the device.

The type of magnetic molded material can be any of those readily available. By way of example, material referred to as SD 190 available from Dynacast, Yorktown Heights, N.Y., has been successfully utilized. However, other types of injection molded magnets can be utilized.

The injection molded magnets cost less than ceramic magnets and offer greater shape versatility than ceramic magnets. They weigh less and are far less brittle than conventional magnets and accordingly won't chip or crack.

Typically, the material is magnetized while being molded. Magnetic pole pieces are placed on the mold to align the particles. This provides up to approximately 20% of the magnetization required. After removal from the mold, and during assembly, the conventional amount of magnetism is provided to the device by again providing further magnetism as is needed.

Figure 7:
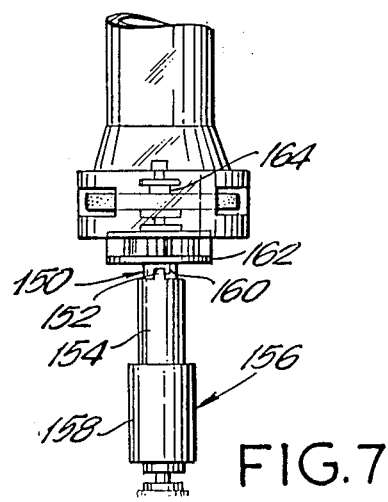
FIG. 7 is a perspective exploded view of a rotor impeller unit of the present invention in accordance with another embodiment thereof and showing a different clutch mechanism.

Although the specific type of clutch mechanism shown in FIGS. 3 and 5 is typically utilized, it should be appreciated that other types of clutch mechanisms can be utilized. By way of example, reference is had to FIG. 7 which shows an alternate type of clutch mechanism, shown generally at 150. The clutch includes a tooth 152 upwardly projecting from the tubular portion 154 of the rotor unit 156. The entire unit 156, including the barrel portion 158 and the tube portion 154, is integrally formed of an injection molded magnet. A corresponding depending tooth 160 is provided on the impeller 162. The impeller rotates on the shaft 164 and the shaft is fixed in the lower end of the unitary intake assembly.

There has been disclosed heretofore the best embodiment of the invention presently contemplated. However, it is to be understood that various changes and modifications may be made thereto without departing from the spirit of the invention.

What is claimed is:

1. An aquarium filter comprising a filter housing having an intake chamber for receiving contaminated aquarium water and a filter chamber in which the contaminated aquarium water is filtered and subsequently discharged back into the aquarium, a stator unit mounted onto the housing, and having a well therein, and a rotor assembly electromagnetically driven by said stator unit, said rotor assembly comprising a shaft, a magnetic rotor directly mounted onto the shaft and supported within said well, and an impeller rotatably mounted with respect to the shaft and driven by said magnetic rotor, said impeller drawing the aquarium water into the filter and into the well, said magnetic rotor being arranged to fit within said well, said magnetic rotor including an integral magnetic tube, with said tube and rotor being integrally formed of injection molded magnet material, said rotor and tube having a tapered coaxial bore and a push-in bearing inserted into at least one end of said bore for alignment of the shaft in the rotor, and said impeller comprises a sleeve mounted over said tube.

2. An aquarium filter as in claim 1, and further comprising clutch means for arbitrarily driving said impeller in either of two opposing rotational directions.

* * * * *